US005742864A

United States Patent [19]

Kwack

[11] Patent Number: 5,742,864

[45] Date of Patent: Apr. 21, 1998

[54] EXPOSURE APPARATUS FOR USE IN THE MANUFACTURE OF COLOR CRTS

[75] Inventor: Jongseop Kwack, Kyungju-si, Rep. of Korea

[73] Assignee: Samsung Display Devices Co., Ltd., Kyungki-do, Rep. of Korea

[21] Appl. No.: 675,716

[22] Filed: Jul. 3, 1996

[30] Foreign Application Priority Data

Sep. 25, 1995 [KR] Rep. of Korea ........................ 95-25999

[51] Int. Cl.[6] ........................................ G03B 41/00

[52] U.S. Cl. ............................ 396/546; 445/52; 348/823; 348/824

[58] Field of Search .................................. 358/475, 485, 358/474, 507, 509; 313/365; 396/546, 547; 250/235; 430/23; 445/52, 36; 348/284, 325, 776, 805, 806, 808, 784, 809, 823, 824, 826, 832, 841, 835, 830, 836

[56] References Cited

U.S. PATENT DOCUMENTS

| | | | |
|---|---|---|---|
| 3,810,196 | 5/1974 | Barten | 396/547 |
| 3,848,983 | 11/1974 | Fridrich | 396/547 |
| 3,876,425 | 4/1975 | Geenen et al. | 396/547 |
| 3,888,673 | 6/1975 | Suzuki et al. | 396/547 |
| 3,900,854 | 8/1975 | Osakabe et al. | 396/547 |
| 3,906,515 | 9/1975 | Hosokoshi et al. | 396/547 |
| 4,059,834 | 11/1977 | Hosokoshi et al. | 396/547 |
| 4,122,461 | 10/1978 | Morean et al. | 396/547 |
| 4,152,154 | 5/1979 | Geenen et al. | 396/547 |
| 4,206,986 | 6/1980 | Kotoyori et al. | 396/546 |
| 4,222,642 | 9/1980 | van Nes et al. | 396/547 |
| 4,256,390 | 3/1981 | Fisher et al. | 396/547 |
| 4,586,799 | 5/1986 | Hayashi et al. | 396/546 |
| 4,634,247 | 1/1987 | Morrell et al. | 396/547 |
| 4,866,466 | 9/1989 | Van der Waal | 396/547 |
| 5,001,026 | 3/1991 | Bozek et al. | 396/546 |
| 5,025,166 | 6/1991 | Miyata et al. | 396/546 |
| 5,122,819 | 6/1992 | Sato | 396/546 |
| 5,221,938 | 6/1993 | Kim | 396/546 |
| 5,477,285 | 12/1995 | Riddle et al. | 396/546 |
| 5,519,217 | 5/1996 | Wilbur, Jr. et al. | 445/52 |
| 5,570,145 | 10/1996 | Soneda | 396/547 |
| 5,595,519 | 1/1997 | Huang | 445/52 |

*Primary Examiner*—Edward L. Coles, Sr.
*Assistant Examiner*—Fan Lee
*Attorney, Agent, or Firm*—Christie, Parker & Hale, LLP

[57] ABSTRACT

An exposure apparatus includes a light source a range gauge, which refracts the light emitted from the light source at a fixed angle and a filter gauge that projects the light passing through the range gauge in different amounts to the circumference and center of the panel. The exposure further includes a reflection member fixed outside the panel which re-directs the light that passes through the panel so that it can be used again for exposure.

4 Claims, 2 Drawing Sheets

EXPOSURE APPARATUS FOR USE IN THE MANUFACTURE OF COLOR CRTS

BACKGROUND

The present invention relates to an exposure apparatus for use in the manufacture of color CRTs, and more particularly, to an exposure apparatus in which there is a high coefficient of light utilization and in which exposure time is reduced.

Generally, color CRTs have phosphor pixels that are applied on a phosphor layer of color cathode-ray tubes, and depending on how the phosphor pixels are arranged, the CRTs are classified into either dot matrix or stripe matrix.

A BM (Black Matrix) is applied on the inside part of CRT panels so as to improve the quality of R,G,B phosphor material and definition. A clear sensitizing material is evenly applied on the inside portion of the panel, and the area on which the phosphor body is to be placed is exposed. After BM is applied on the area that was not exposed, phosphor material is applied to every location, excluding the exposed sensitizing material, and the inside part of the panel is exposed so as to be kept in a firm, adhesive state.

An example of this exposure apparatus is illustrated in FIG. 3 and it includes a light source 2 needed for exposure; a range gauge 4 that directs the light coming out of the light source 2 at a fixed angle, and ensures that the deflected electron beam is irradiated on the landing area; and a filter gauge 8 that takes the amount of light passing through the range gauge 4 and applies the right amount, at a constant level, to the central and circumference of a panel 6.

The filter gauge 8 applies a small amount of light to the central part of the panel 6 and a large amount to the circumference of the panel 6. This is accomplished by coating the central part of the filter member with metal having a low light transmission ratio, and with material that has an increasingly higher light transmission ratio as further extremities in the circumference of the filter member is reached.

In the above exposure apparatus, light emitted from the light source 2 passes through the range gauge 4 and filter gauge 8 and is irradiated on the sensitizing material, applied to the inner part of the panel 6, and the sensitizing material is thus exposed, and by passing through the panel 6, the light is transmitted to the outside.

But in the above exposure apparatus, the light from the light source 2, as it is directed on to the sensitizing material layer and passed through the panel, when finally transmitted to the outside, is greatly damaged.

SUMMARY

The present invention has been made in an effort to solve the above problem.

It is an object of the present invention to provide an exposure apparatus wherein the light, when it is directed on to a phosphor side sensitizes a sensitizing material, and the light that is passed through a panel to the outside is re-focused along the same path, and the amount of light that is used in exposure is increased equal to the amount of light that is re-focused.

To achieve the above object, the present invention provides an exposure apparatus including a light source; a range gauge, which refracts the light emitted from the light source at a fixed angle; and a filter gauge that projects the light passing through the range gauge in different amounts to the circumference and center of the panel.

The exposure apparatus for use in the manufacture of color cathode-ray tubes also includes a reflection member fixed outside the panel which re-directs the light that permeates the panel so that it can be used again for exposure.

Also, the reflection member has a number of reflection plates where the light passing through the panel is reflected.

In addition, formed adjacent to the reflection plates are stepped portions so as to allow the light to be re-directed in the same path in which it came.

Finally, the angle between the reflection plates and stepped portions is less than 90 degrees.

BRIEF DESCRIPTION OF THE DRAWINGS

These and other features, aspects, and advantages of the present invention will become better understood with regard to the following description, appended claims, and accompanying drawings where:

DESCRIPTION

Reference will now be made in detail to the present preferred embodiment of the invention, an example of which is illustrated in the accompanying drawings. Wherever possible, the same reference numbers will be used throughout the drawings to refer to the same or like parts.

Figure 1:
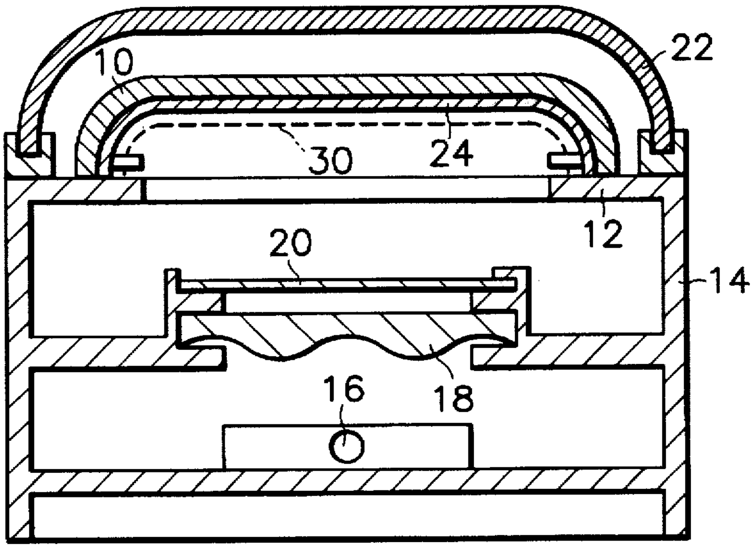
FIG. 1 is a sectional side view of an exposure apparatus in accordance with a preferred embodiment of the present invention.
Figure 3:
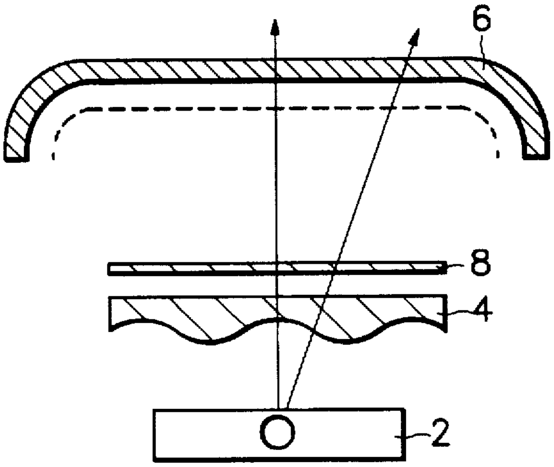
FIG. 3 is a drawing used to explain the prior art exposure apparatus.

FIG. 1 is a sectional side view of an exposure apparatus in accordance to a preferred embodiment of the present invention. The exposure apparatus includes a housing 14; an upper plate 12, which is formed as part of the housing 14; a panel 10 to be exposed, which is placed on the upper plate 12; and a light source 16, positioned on the inside, lower part of the housing 14.

The above exposure apparatus further comprises a range gauge 18 that refracts the path of the light emitted from the light source 16 towards the deflective angle of the electron beam and in an equal degree of angle. Also included is a filter gauge 20 which controls the light passing through the range gauge so that a small amount is emitted on the central part of the panel 10 and relatively larger amounts are emitted as farther parts of the outer surface of the panel 10 is reached.

This structure, thus far, is identical to that of the prior art. But the present invention employs the use of a reflection member 22 which is placed outside the panel 10.

This reflection member 22 re-directs the light permeating through the panel 10, along the same path, so that it passes through the panel 10 again and onto a phosphor layer 24 which is applied on the inside face of the panel 10.

Figure 2:
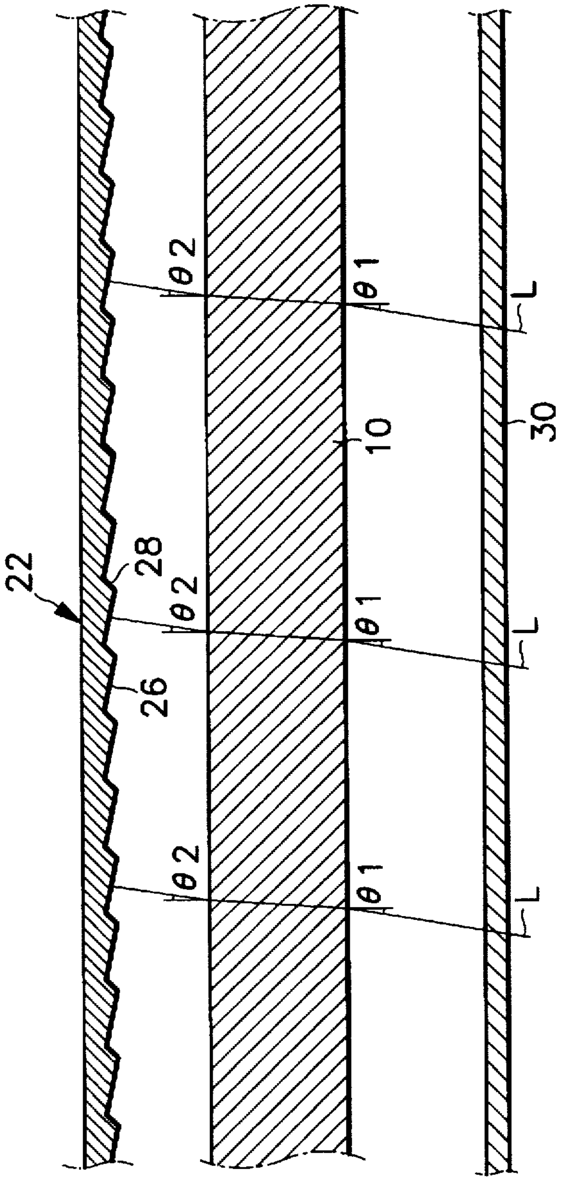
FIG. 2 is a sectional side view illustrating a reflecting member portion in accordance with a preferred embodiment of the present invention.

FIG. 2 is an enlarged drawing of the reflection member 22 portion of the present invention. The face on which light is emitted has a number of reflection plates 26.

These reflection plates 26 re-direct the light at exactly the same angle in which it passes through the panel.

Accordingly, formed adjacent to and between the reflection plates are stepped portions 28.

As there is less than a 90 degree angle in the interval between the reflection plates 26 and stepped portions 28, diffused reflection is prevented.

In the drawings, the reference numeral 30 indicates a shadow mask.

The aspects of the present invention which include light, emitted from the light source 16, that passes through the range gauge 18 and filter gauge 20 and is projected on to the phosphor layer 24 and, thus, sensitizing the sensitizing material of the phosphor body, is identical to that of the prior art.

However, as the light sensitizes the phosphor layer 24 and passes through the panel 10, as can be seen in FIG. 2, the light(L) is refracted inside the panel 10 to a θ1 angle, and outside the panel at a θ2 angle.

Because the reflection plates 26 of the reflection member 22 according to the present invention are positioned so as to re-direct the light along the same path, the light, that is emitted on to the reflection plates 26, is again emitted on the phosphor layer 24.

As the phosphor layer 24 receives this additional irradiation of light (in the amount of light that is redirected), exposure time is reduced.

According to tests, there is approximately a 40% increase in the amount of light received, and therefore, exposure time decreases in the same amount.

As explained above, the exposure apparatus according to the present invention includes a reflection member that allows the light that transmits through the panel to be used again for exposure. As a result, far less exposure time is needed compared to that of the prior art and productivity, which is related to exposure time, is increased.

While this invention has been described in connection with what is presently considered to be the most practical and preferred embodiment, it is to be understood that the invention is not limited to the disclosed embodiments, but, on the contrary, it is intended to cover various modifications and equivalent arrangements included within the spirit and scope of the appended claims.

What is claimed is:

1. Art exposure apparatus for use in the manufacture of color CRTs, comprising:

a light source; a range gauge, which refracts the light emitted from the light source at a fixed angle;

a filter gauge that projects the light, emitted from the range gauge, toward the center and circumference of a panel in different amounts; and a reflection member placed outside the panel which allows the light passing through the panel to be used again for exposure.

2. The exposure apparatus for use in the manufacture of color CRTs of claim 1, wherein the reflection member has a number of reflection plates where the light coming through the panel is projected.

3. The exposure apparatus for use in the manufacture of color CRTs of claim 2, wherein adjacent to the reflection plates are formed stepped portions which, because of their positioning, allow the reflection plates to re-direct the light along its same path.

4. The exposure apparatus of claim 3, wherein the angle between the reflection plates and stepped portions is less than 90 degrees.

* * * * *

UNITED STATES PATENT AND TRADEMARK OFFICE

CERTIFICATE OF CORRECTION

PATENT NO. : 5,742,864

DATED : April 21, 1998

INVENTOR(S) : Jongseop Kwack

It is certified that error appears in the above-identified patent and that said Letters Patent is hereby corrected as shown below:

On the title page, Item [57],

Abstract, line 1, after "source" insert a comma.

Column 4, line 7, replace "Art" with -- An --.

Column 4, line 9, begin a new paragraph with "a range gauge . . .".

Signed and Sealed this

Twentieth Day of July, 1999

Attest:

Q. TODD DICKINSON

Attesting Officer

*Acting Commissioner of Patents and Trademarks*